May 3, 1960 J. J. MURPHY ET AL 2,935,706
ELECTROMECHANICAL FILTER ASSEMBLAGE
Filed June 15, 1955
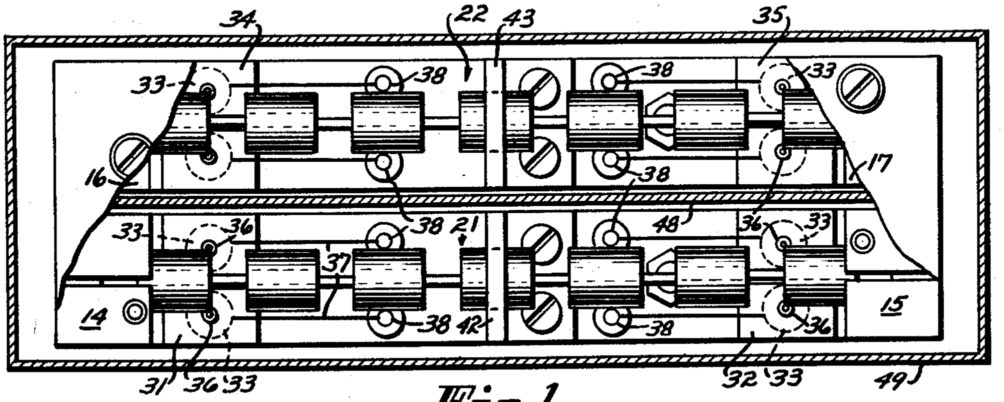
Fig.1
Fig.2
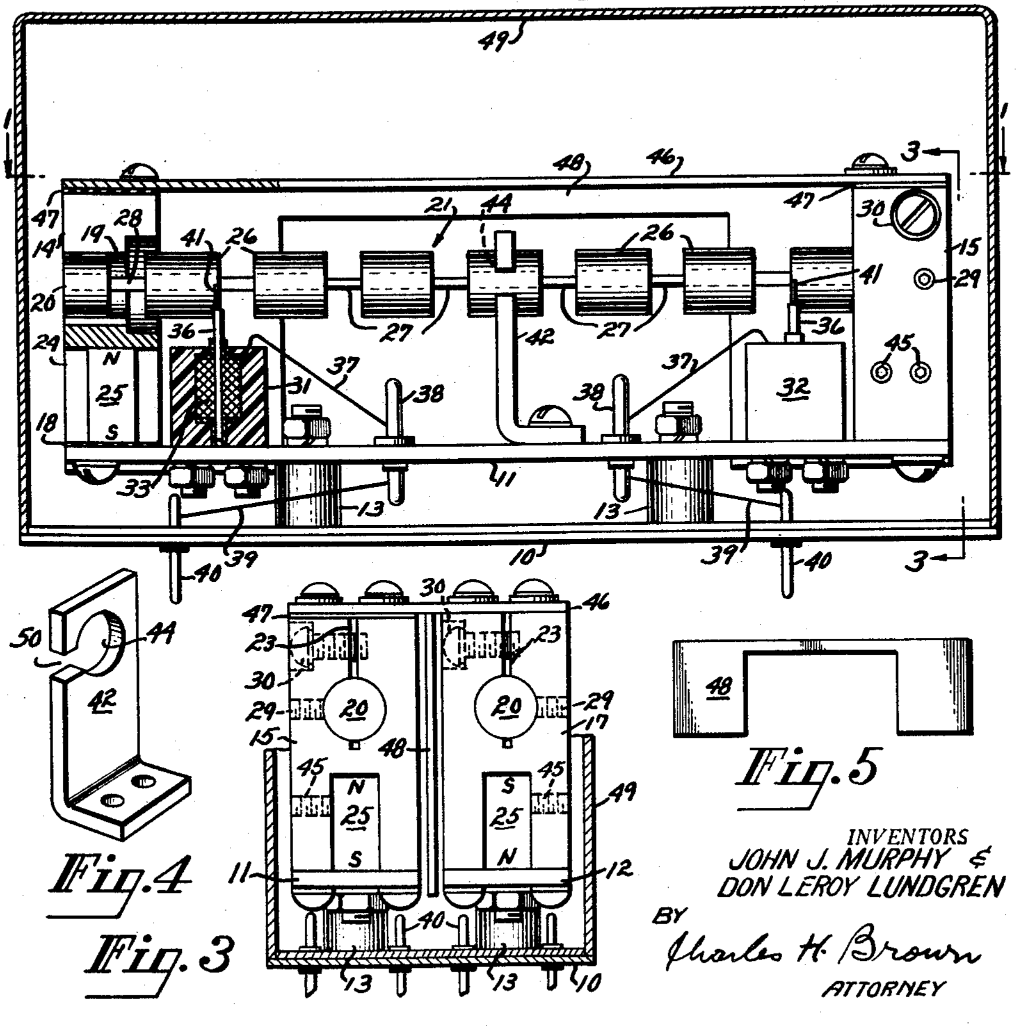
Fig.3 Fig.4 Fig.5
INVENTORS
JOHN J. MURPHY &
DON LEROY LUNDGREN
BY Charles H. Brown
ATTORNEY United States Patent Office 2,935,706

Patented May 3, 1960

2,935,706

ELECTROMECHANICAL FILTER ASSEMBLAGE

John Joseph Murphy, Maple Shade, and Don Le Roy Lundgren, Haddonfield, N.J., assignors to Radio Corporation of America, a corporation of Delaware Application June 15, 1955, Serial No. 515,672

5 Claims. (Cl. 333—71)

The invention relates to electromechanical filters, and particularly to a mounting assemblage for a plurality of electromechanical filters.

An object of the invention is to provide an improved electromechanical filter assemblage capable of withstanding severe shocks.

Another object of the invention is to provide a compact and sturdy electromechanical filter assemblage or package for a plurality of mechanical filters having different frequency selective characteristics.

In one embodiment of the invention constructed and successfully tested, the mechanical filter package or assemblage comprises a pair of individual filters positioned side-by-side and separately supported on individual chassis, in turn mounted on a common base. Each filter is supported by a pair of end posts positioned at opposite ends of its associated chassis. One post of each pair of posts is electrically insulated from its chassis, while the other post of the same pair is electrically connected to its chassis. Each end post has a first and a second opening, the first opening being designed to hold the mounting slug of a mechanical filter element, and the second opening being designed to hold a bias magnet. A brace, designed to reduce transverse shock to mechanical filter elements is mounted on each chassis intermediate the ends of the filter supported by the chassis and between the respective pairs of posts. A flat metallic cover plate is mounted on the end posts and over both mechanical filters and is electrically connected to only one post and is insulated from all of the other posts. A radio frequency (R.F.) shield, positioned between the two chassis, is fastened to the cover plate. If desired, an overall can-like cover may be placed over the cover plate and the entire assemblage for hermetically sealing the assemblage or package.

The invention is explained in greater detail in connection with the accompanying drawing, in which:

Figure 1 shows a top view of a dual electromechanical filter package or assemblage in accordance with the invention, with the outer cover shown in section and the cover plate partly broken away to show the assemblage more clearly;

Figure 2 shows a side view of the mechanical filter assemblage, partly in section;

Figure 3 shows an end view of the mechanical filter assemblage taken along the line 3—3 in Figure 2;

Figure 4 shows a perspective view of one of the braces used in the assemblage; and Figure 5 shows a view of the shield used in the assemblage.

Referring to the drawing, there is shown a packaged mechanical filter comprising a pair of mechanical filter elements 21, 22 placed side-by-side in physically parallel relation and individually mounted on metallic chassis 11, 12 respectively. The individual chassis 11, 12 are in turn supported by metallic pillars 13 on a common metallic base 10. The chassis 11, 12 are of such dimensions that their boundaries are within the boundaries of the base 10 when viewed from above. First and second similar, metallic end posts 14, 15 are mounted on opposite ends of the first chassis 11, and third and fourth similar, metallic end posts 16, 17 are mounted on opposite ends of the second chassis 12. The first and third posts 14, 16 are located side-by-side at adjacent ends of their respective chassis 11, 12, and are electrically insulated therefrom by strips of insulation 18. The second and fourth posts 15, 17 are located side-by-side at the other ends of their respective chassis 11, 12, and are electrically connected thereto.

Each of the end posts 14, 15, 16, 17 has a first cylindrically shaped opening 19 that is adapted to hold the cylindrical mounting slug 20 of an electromechanical filter element such as 21 or 22. The openings 19 in the first and second posts 14, 15 are similar and are axially aligned with each other; and the openings 19 in the third and fourth posts 16, 17 are also similar and are axially aligned with each other. Longitudinal slots 23 may be placed in the posts 14, 15, 16, 17 so that the mounting slugs 20 may be tightly clamped by screws 30. Each of the end posts 14, 15, 16, 17 also has a second rectangularly shaped opening 24 for accommodating a rectangular bias magnet 25.

The electromechanical filter elements 21, 22 shown in the drawing each comprise seven cylindrically shaped resonator elements 26 interconnected by coupling necks 27 and connected to the mounting slugs 20 by mounting coupling necks 28. The resonator elements 26 shown are made of some magnetostrictive material such as Ni-Span-C (an alloy comprising nickel and iron and currently produced by the International Nickel Company) and in the specific embodiment shown are designed to operate in the torsional mode. In accordance with the current practices in the art, the selectivity of the filter elements 21, 22 may be varied by changing the number of the resonator elements 26, and the pass bands and coefficients of coupling may be varied by changing the diameters of the coupling necks 27 and/or the diameters of the resonator elements 26. Since the assemblage is intended to provide two compact electromechanical filters having different pass bands, the filter elements 21, 22 have different dimensions. The mounting slugs 20 are positioned in their respective first openings 19 and are held securely by set screws 29 and tightening screws 30 which force the sides of the slots 23 together.

First and second coil blocks 31, 32 made of some insulating material such as polystyrene, and each having a pair of coils 33 imbedded therein that are serially connected to produce opposing fields, are mounted on the first chassis 11 at a location adjacent to the end posts 14, 15 respectively. Likewise, third and fourth coil blocks 34, 35 made of the same material as the first and second blocks 31, 32 and each having a pair of coils 33 imbedded therein that are serially connected to produce opposing fields, are mounted on the second chassis 12 at a location adjacent to the end posts 16, 17 respectively. It should be noted that a pair of coils 33 are provided for each end of each filter and these coils 33 are oppositely disposed relative to the end resonator element 26. The coils 33 and their respective blocks 31, 32, 34, 35 are located so that the coils 33 may be coupled to rod-like magnetostrictive transducers 36 that are tangentially fastened to the end resonator elements 26 of the filter elements 21, 22. Leads 37 connect the coils 33 to insulated terminals 38 respectively, on the chassis 11, 12 and leads 39 connect the chassis terminals 38 to insulated terminals 40 in the base 10. If desired, capacitors may be connected in series or in parallel with each pair of coils 33 located at each end of a filter by connecting them between the appropriate terminals 38, 40 for a pair of coils 33, or across appropriate terminals 38, 40 for a pair of coils 33. The pair of coils 33 at one end of a filter may be the input coils of the filter to excite the same while the pair of coils 33 at the other end of the same filter may be the output coils of the filter to derive energy therefrom.

Pairs of the rod-like magnetostrictive transducers 36 for supplying energy to or deriving energy from the filter elements 21, 22 are fastened to the filter elements 21, 22 by fine wires 41 connected tangentially at diametrically opposite points on the end resonator elements 26. The transducers 36 are magnetically biased by the bias magnets 25, and are vibrated in the longitudinal mode by a current flow through those coils 33 which serve as input coils for the filter elements 21, 22. The coils 33 serving as input coils are magnetically coupled to those transducers 36, and are connected so that a current flow through pairs of the input coils 33 causes their respective transducers 36 to contract and expand in the opposite sense respectively. Thus, a couple is produced on the input end resonator elements 26 thereby causing the filter elements 21, 22 to vibrate in the torsional mode. At the output end of the filter elements 21, 22, the torsional vibrations of the end resonator elements 26 cause longitudinal vibrations of the transducers 36 attached thereto. The pairs of coils 33 serving as output coils 33 are magnetically coupled to these transducers 36 at the output end and are so connected that the longitudinal vibrations of opposite sense produced in their respective transducers 36 produce currents that aid each other.

Metallic braces 42, 43 are respectively centrally mounted on the first and second chassis 11, 12. A perspective view of one brace 42 is shown in Figure 4. Each of the braces 42, 43 has a transverse, circular opening 44 having a diameter slightly greater than the diameter of the resonator element 26 which it surrounds. The braces 42, 43 thus provide a limit beyond which the central portions of the filter elements 21, 22 cannot be deformed. If this limit is less than the elastic limit of the filter element material, the filter elements 21, 22 are protected against permanent deformation. The openings 44 have a slot 50 on one side of the brace to permit a coupling neck 27 to be passed therethrough, thus facilitating assemblage of the filter by permitting the braces 42, 43 to be mounted or removed without disturbing the filter elements 21, 22 or vice versa. By having openings 44 that are slightly larger than the diameter of the resonator elements 26, the braces 42, 43 are able to support the filter elements 21, 22 against extreme transverse shocks without interfering with the operation of the elements 21, 22. The braces 42, 43 may also provide some R.F. shielding between the coils 33 located at opposite ends of the same filter.

The bias magnets 25 are placed in their respective second openings 24 so that the magnets 25 for the posts 14, 15 at opposite ends of one filter have the same poles similarly positioned while the magnets 25 for the posts 16, 17 for the other filter also have the same poles similarly positioned but opposite with respect to the poles of the adjacent magnet for the first filter. Stated in another way, the north poles of one set of magnets for one filter are either both up or both down and the north poles of the magnets for the other filter are similarly positioned either both up or both down but opposite relative to the polarity of the first set of magnets. These polarities are indicated in Figure 3. Such an arrangement reduces interaction between adjacent magnets 25 at the same end of the dual filter assemblage. The bias magnets 25 are held in position by set screws 45 which may be loosened to permit adjustment of the bias magnets 25.

A metallic, rectangular cover plate 46 is mounted on top of the four end posts 14, 15, 16, 17, and is electrically insulated from the first and third posts 14, 16, and from the second post 15 by insulating strips 47.

The cover plate 46 is electrically connected to the fourth post 17 (which is, in turn, electrically connected to the chassis 12), thus providing a ground connection for the cover plate 46 at only one point, namely through the fourth post 17. This reduces circulating currents through the cover plate 46. Fastened and electrically connected to the cover plate 46 is a shield 48 which is made of a metallic shielding material such as brass. The shield 48 extends downward from the cover plate 46 between adjacent end posts 14, 16, and 15, 17 and is intended primarily as an R.F. shield between the two pairs of coils 33 for the two filters at the same end of the filter assemblage. To strengthen the shield 48, a narrow strip of the shield material extends between the two main portions of the shield 48. A separate view of this shield is shown in Figure 5. As shown in Figure 3, the shield 48 does not contact the end posts 14, 15, 16, 17 or the two chassis 11, 12.

Since only the second and fourth end posts 15, 17 are electrically connected to the first and second chassis 11, 12 respectively, the filter elements 21, 22 are grounded at only one and the same end of the assemblage. This prevents stray R.F. currents from circulating through the filter elements 21, 22.

To protect the entire dual filter assembly from dust and moisture, a cover 49 may be placed over the assemblage and soldered to the base 10. The assembly may be thus hermetically sealed.

A filter assemblage constructed in accordance with the invention contained two different frequency selective mechanical filters each having seven torsionally vibrating resonator elements. One filter provided a pass band of 3 kc. while the other filter provided a pass band of 1 kc., both at a center frequency of 200 kc. The entire assemblage was very compact, and its dimensions, including the cover, were 3½ inches long, 1½ inches wide, and 2 inches high. The filter functional satisfactorily in a receiver after being subjected to blows from three directions by a 400 pound hammer falling from distances of one, two, and three feet.

It will thus be noted that the invention provides a packaged dual filter assemblage wherein the interaction between the two filters and their respective components is negligible. The entire assemblage is very sturdy even though subjected to extreme mechanical shocks. While the drawing shows two filters contained within the assembly, it will be obvious to a person skilled in the art that the assembly may contain only one filter.

The invention claimed is:

1. An electromechanical filter assemblage, comprising a metallic chassis, first and second metallic end posts mounted on opposite ends of said chassis, means for electrically insulating at least one of said end posts from said chassis, each of said posts having a first opening therein adapted to hold a mounting slug of an electromechanical filter element and a second opening therein adapted to hold a bias magnet, a coil mounted on said chassis adjacent to each of said posts, said coils being positioned between said posts, an electromechanical filter element positioned between said posts and having mounting slugs entering said first openings of said posts, coupling means between each of said coils and an adjacent portion of said filter element, a bias magnet positioned in each of said second openings, and a brace mounted on and substantially in the center of said chassis effectively midway between said posts and having a portion thereof surrounding said electromechanical filter element but spaced therefrom a slight amount for reducing the effects of mechanical shock on said filter element.

2. An electromechanical filter assemblage, comprising a chassis, first and second end posts mounted on opposite ends of said chassis, each of said posts having a first opening therein adapted to hold a mounting slug of an electromechanical filter element and a second opening therein adapted to hold a bias magnet, a coil mounted on said chassis adjacent to each of said posts, an electromechanical filter element positioned between said posts on said base and having mounting slugs entering said first openings of said posts, a coupling between each of said coils and an adjacent portion of said filter element, and a brace mounted on and substantially in the center of said chassis effectively midway between said posts and having a portion thereof surrounding said electromechanical filter element but spaced therefrom a slight amount for reducing the effects of mechanical shock on said filter element.

3. An electromechanical filter assemblage comprising a metallic chassis, end posts mounted on opposite ends of said chassis, said posts each having an opening therein, an electromechanical filter element comprising a plurality of resonator elements interconnected by coupling necks and having a mounting slug fastened thereto in axial alignment therewith at each end thereof, said electromechanical filter element being positioned between said posts with said mounting slugs positioned in said openings of said posts, coils mounted on said chassis adjacent and between each of said posts respectively, rod-like magnetostrictive transducers tangentially mounted at diametrically opposite points on the end resonator elements of said electromechanical filter element and coupled to said respective coils, said transducers extending away from their points of mounting along lines that are substantially at right angles to the longitudinal axis of said filter element, a brace comprising a metallic plate mounted on said chassis between said coils, the upper portion of said brace surrounding at least part of an intermediate resonator element and slightly spaced therefrom to provide a limit beyond which the filter cannot be deformed when subjected to shock, the width of said brace being substantially the width of said chassis to improve radio frequency shielding between the coils on opposite sides thereof and means coupled to said transducers for magnetically biasing said transducers.

4. An electromechanical filter assemblage comprising a metallic chassis, first and second metallic end posts mounted on opposite ends of said chassis, means for electrically insulating one of said posts from said chassis, means for electrically connecting the other of said posts to said chassis, said posts each having a cylindrically shaped opening therein, said openings being axially aligned, an electromechanical filter element comprising a plurality of slug-type cylindrically shaped resonator elements interconnected by coupling necks and having a cylindrically shaped mounting slug fastened thereto at each end thereof in axial alignment therewith, said electromechanical filter element being positioned between said posts with said mounting slugs positioned in said openings of said posts, first and second pairs of serially connected coils mounted on said chassis adjacent and between each of said posts respectively, first and second pairs of rod-like magnetostrictive transducers tangentially mounted at diametrically opposite points on the end resonator elements of said electromechanical filter element and coupled to said first and second pairs of coils respectively, bias magnets positioned adjacent to said transducers and coupled thereto, a brace mounted on said chassis between said first and second pairs of coils, said brace comprising a metallic plate having an opening therein, the wall of which surrounds but is spaced from a resonator element of said mechanical filter element, said opening having a diameter slightly greater than the diameter of the resonator element which it surrounds, whereby said brace acts to support said filter element only upon the occurrence of transverse shocks thereto, and a metallic cover plate mounted on said posts.

5. An electromechanical filter assemblage comprising a metallic base, a metallic chassis fastened to said base, first and second metallic end posts mounted on opposite ends of said chassis, means for electrically insulating one of said posts from said chassis, means for electrically connecting the other of said posts to said chassis, said posts each having a first cylindrically shaped opening therein and a second opening therein, said first openings being axially aligned, an electromechanical filter element comprising a plurality of slug-type cylindrically shaped resonator elements interconnected by coupling necks and having a cylindrically shaped mounting slug fastened thereto at each end thereof in axial alignment therewith, said electromechanical filter element being position between said posts with said mounting slugs positioned in said first openings of said posts, a first pair of serially connected coils mounted on said chassis adjacent one of said posts and between said posts, a second pair of serially connected coils mounted on said chassis adjacent the other of said posts and between said posts, first and second pairs of rod-like magnetostrictive transducers tangentially mounted at diametrically opposite points on the end resonator elements of said electromechanical filter element and coupled to said first and second pairs of coils respectively, bias magnets positioned in each of said second openings in said posts and coupled to the respective transducers, a brace mounted on said chassis between said first and second pairs of coils, said brace comprising a metallic plate having an opening therein surrounding a resonator element of said mechanical filter element, said opening having a diameter slightly greater than the diameter of said resonator element which it surrounds so that the edges of said opening are spaced from said resonator element, whereby said brace acts to support said filter element only upon the occurrence of transverse shocks thereto, a metallic cover plate mounted on said posts, and a metallic cover for said assemblage.

References Cited in the file of this patent

UNITED STATES PATENTS

| | | |
|---|---|---|
| 2,112,560 | Davies | Mar. 29, 1938 |
| 2,619,604 | Burns | Nov. 25, 1952 |
| 2,652,542 | Anthony et al. | Sept. 15, 1953 |
| 2,656,516 | Doelz | Oct. 20, 1953 |
| 2,667,621 | Burns et al. | Jan. 26, 1954 |
| 2,693,580 | Peterson | Nov. 2, 1954 |
| 2,709,243 | Babcock | May 24, 1955 |
| 2,762,985 | George | Sept. 11, 1956 |
| 2,810,888 | George et al. | Oct. 22, 1957 |
| 2,810,889 | Lundgren | Oct. 22, 1957 |